(12) United States Patent
Webb

(10) Patent No.: US 7,247,832 B2
(45) Date of Patent: Jul. 24, 2007

(54) SIGNAL PROCESSING CIRCUIT AND METHOD USING ANALOG VOLTAGE SIGNAL TO PULSE WIDTH MODULATION CONVERSION

(75) Inventor: Douglas A. Webb, Los Altos, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 0 days.

(21) Appl. No.: 11/223,389

(22) Filed: Sep. 9, 2005

(65) Prior Publication Data

US 2007/0057165 A1    Mar. 15, 2007

(51) Int. Cl.
- *G01J 1/44* (2006.01)
- *G01N 21/86* (2006.01)
- *G06M 7/00* (2006.01)
- *G09G 5/08* (2006.01)
- *H04N 3/14* (2006.01)
- *G01J 1/32* (2006.01)

(52) U.S. Cl. .......................... 250/214 R; 250/559.29; 250/221; 250/205; 345/157; 348/300

(58) Field of Classification Search ............ 250/214 R, 250/214 A, 559.29, 221, 205; 345/156–167; 348/300
See application file for complete search history.

(56) References Cited

U.S. PATENT DOCUMENTS

| | | | |
|---|---|---|---|
| 4,740,675 A * | 4/1988 | Brosnan et al. ........ | 235/462.27 |
| 6,031,218 A | 2/2000 | Piot et al. | |
| 6,137,566 A * | 10/2000 | Leonard et al. ......... | 356/141.1 |
| 6,424,407 B1 | 7/2002 | Kinrot et al. | |
| 2005/0134556 A1* | 6/2005 | VanWiggeren et al. ..... | 345/156 |

\* cited by examiner

*Primary Examiner*—Georgia Epps
*Assistant Examiner*—Pascal M. Bui-Pho
(74) *Attorney, Agent, or Firm*—William E. Nuttle

(57) ABSTRACT

A signal processor and processing method are provided for measuring current received from a photo-detector. Generally, the processor includes a transimpedance amplifier (TIA) to integrate a current received from a photo-detector in the optical navigation system to generate a voltage signal having a slope that is proportional to the received current, and a comparator having a first input coupled to an output of the TIA to receive the voltage signal, and a second, inverting, input coupled to a threshold voltage. The comparator is configured to compare the voltage signal to the threshold voltage and to generate an output pulse having a predetermined voltage and a duration or width that is a function of the received current.

14 Claims, 10 Drawing Sheets

US 7,247,832 B2

SIGNAL PROCESSING CIRCUIT AND METHOD USING ANALOG VOLTAGE SIGNAL TO PULSE WIDTH MODULATION CONVERSION

TECHNICAL FIELD

The present invention relates generally to signal processing, and more particularly to a signal processing circuit and method for measuring current received from a photo-detector in an optical navigation device.

BACKGROUND OF THE INVENTION

Signal processors are used in a wide range of applications including, for example, measuring a current output from a photo-detector of an array in an optical navigation system. Optical navigation systems, such as an optical computer mouse or trackball, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

One embodiment of an optical computer mouse uses a coherent light source, such as a laser, to illuminate a rough surface, and an array of a number of photo-sensors or detectors, such as photodiodes, to receive light scattered from the surface. Light from the coherent source scattered off of the surface generates a random intensity distribution of light known as speckle. The varying intensity of scattered light detected by the photo sensors in the array as the mouse is moved across the surface is used to detect movement of the mouse.

Although a significant improvement over prior art optical mice, these speckle-based devices have not been wholly satisfactory for a number of reasons. In particular, processing signals from the photodiodes involves measuring the current output from the photodiode through an integrating transimpedance amplifier (TIA). The TIA converts current to voltage by producing a voltage output with a slope proportional to the current. Typically, the TIA is either single ended or differential, and is followed by one or more analog-to-digital-converters (ADCs). The disadvantages of this approach using one or more ADCs include a relatively high complexity and high power consumption. In addition, the above approach does not insure that the measurements are made while the TIA is operating continuously in a linear region, and is not saturating before being read by the ADC.

Another problem arises from the fact that the TIA output is reset at the beginning of each sampling period and then allowed to ramp up for a fixed amount of time. At the end of the ramp time, the voltage output is converted to a digital value in the ADC and the next sampling period begins. Ideally, the TIA output should be reset to exactly the same voltage at the beginning of each sampling period. In actuality, there is a variation in the beginning voltage output from the TIA after reset commonly referred to as reset noise. Because the digital value is derived from the output voltage measured at the end of the ramp, this reset noise shows up as noise in the digital value measured, reducing the accuracy of measurement, and therefore the performance of the optical mouse.

One technique for dealing with the above reset noise problem is to measure a digital value at the beginning of the ramp just after reset and then subtract this from the digital value measured at the end of the sampling period, thereby limiting the effects of the reset noise on the measurement. However, this increase in accuracy is accomplished at the expense of requiring twice as many analog to digital conversions, and hence doubling the sampling rate required of the ADCs, and requiring additional digital circuitry to store the beginning voltage value and do the subtraction.

Accordingly, there is a need for a signal processor or circuit and method for measuring current received from a photo-detector in a photo-detector array that uses a circuit having reduced complexity and power consumption. It is further desirable that the circuit and method accomplish this measurement in a way that is substantially independent of and unaffected by reset noise from an integrating transimpedance amplifier output at the beginning of each sample period.

The present invention provides a solution to these and other problems, and offers further advantages over the prior art.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

DETAILED DESCRIPTION

The present invention is directed to a signal processor or signal processing circuit and method for measuring current received from a photo-detector. The circuit has reduced complexity and power consumption over conventional signal processing circuits, and is substantially independent of and unaffected by reset noise from an integrating transimpedance amplifier (TIA) at the beginning of each sample period.

The signal processing circuit and method are particularly advantageous for processing signals from a photo-detector, such as a photodiode or other light sensitive element, in a photo-detector array used in an optical navigation system, such as an optical computer mouse or an optical trackball.

For purposes of clarity, many of the details of optical navigation systems in general and signal processing circuits for optical navigation systems in particular that are widely known and are not relevant to the present invention have been omitted from the following description.

The circuit and method will now be described in greater detail with reference to FIGS. 1 to 10B.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form only in order to avoid unnecessarily obscuring an understanding of the invention.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "to couple" as used herein may include both to directly connect and to indirectly connect through one or more intervening components.

Figure 1:
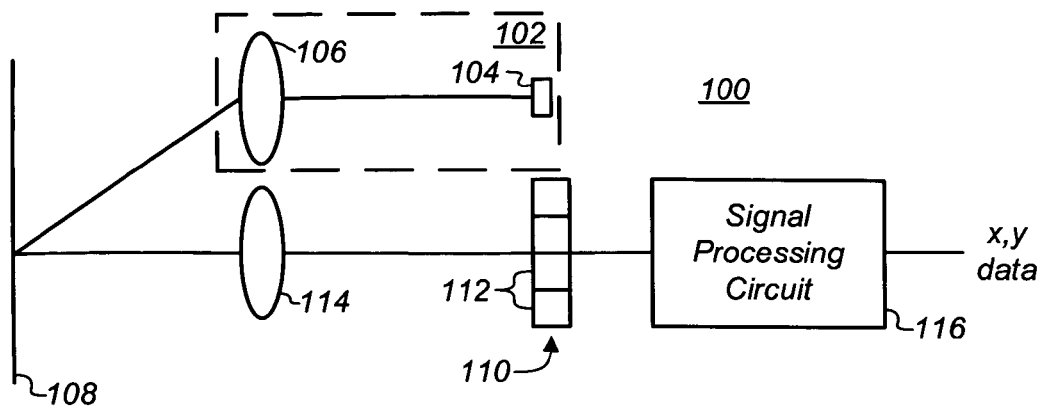
FIG. 1 is a functional block diagram of an optical navigation system having a signal processing circuit according to an embodiment of the present invention.

A functional block diagram of one embodiment of an optical navigation system for which the signal processing circuit and method of the present invention is particularly useful is shown in FIG. 1. Generally, the an optical navigation system 100 includes an illuminator 102 having a light source 104 and illumination optics 106 to illuminate a portion of a surface 108, an array 110 having a number of photo-detectors 112, imaging optics 114, and a signal processor or signal processing circuit 116 for combining and processing signals from each one or a combination of the photo-detectors to produce an output signal from the optical navigation system.

Figure 2:
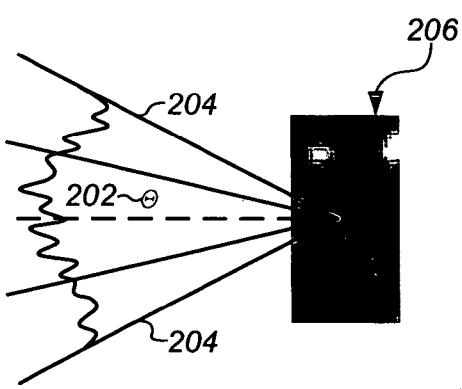
FIG. 2 illustrates speckle in an interference pattern of light reflected from a rough surface.

Preferably, the photo-detectors 112 and signal processing circuit 116 of the optical navigation system 100 are integrally fabricated using a standard semiconductor fabrication processes. More preferably, the optical navigation system 100 is a speckle-based optical navigation system. Most preferably, the optical navigation system 100 is an optically-efficient speckle-based optical navigation system having, for example, structured illumination and telecentric imaging. By speckle it is meant a random intensity distribution of light from a coherent source scattered off of a rough surface to generate an interference pattern known as speckle. Speckle in an interference pattern of light reflected from a rough surface is illustrated in FIG. 2 where angle θ 202 is an angle of incidence with respect to the surface normal of the incident light, 204 is the scattered light, and 206 is the speckle pattern of the reflected or scattered light. Speckle-based optical navigation systems are described, for example, in co-pending, commonly assigned U.S. patent application Ser. No. 11/129,967, entitled, "Optical Positioning Device Having Shaped Illumination," filed on May 16, 2005 by Clinton B. Carlisle et al., and incorporated herein by reference in its entirety.

It has been found that a speckle-based optical navigation system using the signal processing circuit and method of the present invention can meet or exceed all performance criteria typically expected of such systems, including maximum displacement speed, accuracy, and path error rates, while reducing the amount of electrical power dedicated to signal processing and displacement-estimation in the system.

Briefly, the signal processing circuit of the present invention uses transimpedance amplifiers (TIAs) having an internal capacitor or capacitors to integrate current from the photo-detectors to create a voltage signal having a fixed ramp or slope. Comparators at the output of each TIA determine when the ramp or slope of a voltage signal crosses a threshold thereby converting the slope to a pulse having a predetermined voltage and a width or duration that is a function of the received current. This pulse can then be used to latch a counter thereby performing an analog to digital conversion of the current.

By eliminating the standard analog-digital-converter (ADC) or converters of a conventional signal processor in an optical navigation system, the inventive signal processing circuit insures that any measurement of the voltage signal is made in the linear region of the TIA, and that the TIA is not saturating before being read by an ADC.

Figure 3A:
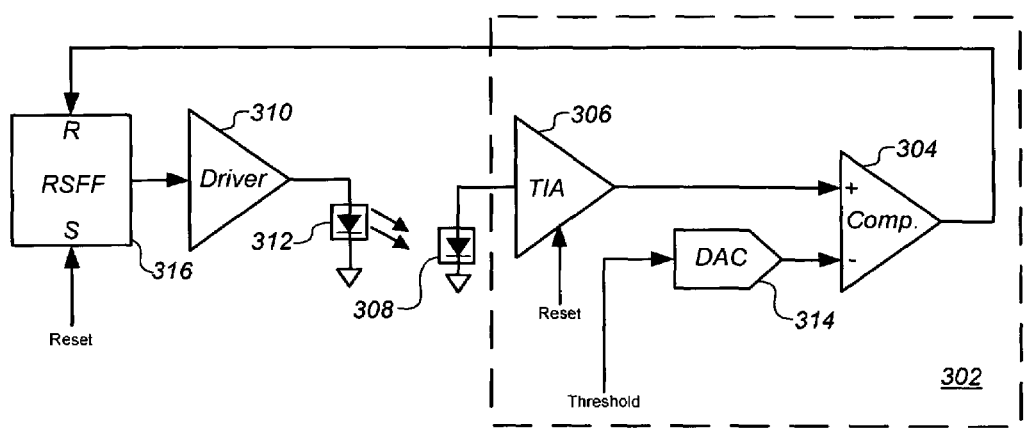
FIG. 3A is a block diagram of a circuit for measuring current received from a photo-detector in an optical navigation system according to an embodiment of the present invention.

The signal processing circuit 302 in its simplest form, shown in FIG. 3, includes a single comparator 304 at the output of each TIA 306 to measure the amplitude of current received from a photo-detector, such as a photodiode, or a photo-detector array 308. Referring to FIG. 3A, power is supplied through a driver 310 to a light source 312, such as a semiconductor micro-laser diode or Vertical Cavity Surface Emitting Laser (VCSEL), which provides reflected light to the photo-detector 308. The photodiode generates a current in response to the received light, which is then coupled to an input of the TIA 306. The TIA 306 integrates the received current over a predetermined sample period to generate a voltage signal having a monotonically increasing ramp or slope as described above. In the embodiment shown, the voltage signal is coupled to a first, non-inverting input of the comparator 304, which is configured to compare the voltage signal to a threshold voltage or level coupled to a second, inverting input of the comparator, and to generate an output pulse having a predetermined voltage and a width that is a function of the received current.

In the embodiment shown, the threshold level is provided as a digital signal coupled to the second input of the comparator 304 through a digital-to-analog converter 314 (DAC). However, it will be apparent that the threshold level can also be directly applied to the comparator 304 as an analog voltage from a voltage divider or other voltage source.

Optionally, an output of the comparator 304 is coupled through a control element, such as a RS flip-flop 316 (RSFF), to the driver 310 supplying power to the light source 312. Thus, when the voltage signal reaches or is equal to the threshold level, the circuit 302 turns off the light source 312, thereby reducing power consumption in the optical navigation system.

Figure 3B:
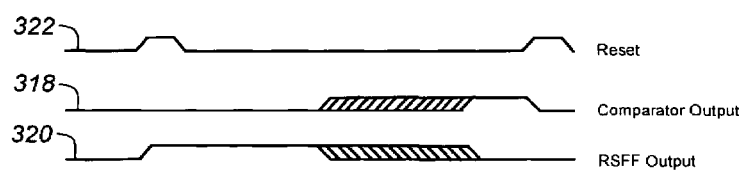
FIG. 3B is a timing diagram illustrating a comparator output and a flip-flop output (RSFF) in relation to a reset pulse for the circuit of FIG. 3A.

FIG. 3B is a timing diagram illustrating the comparator output 318 pulse and the RSFF output 320 in relation to an initialization or reset pulse 322 for the signal processing circuit 302 of FIG. 3A.

Figure 3C:
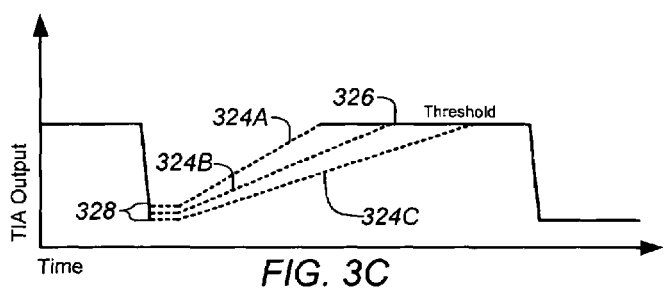
FIG. 3C is a graph illustrating the outputs from a transimpedance amplifier (TIA) versus time for a number of different input currents to the circuit of FIG. 3A according to an embodiment of the present invention.

A graph illustrating three (3) signals 324A-C of the infinite possible voltage signals output from the TIA 306 for the circuit 302 of FIG. 3A is shown in FIG. 3C. It will be noted that the time for a voltage signal 324A-C output from the TIA 306 to reach a predetermined threshold level 326 is dependent primarily on the current received from the photo-detector 308. A higher current results in a voltage signal having a higher or steeper slope or ramp. It will also be noted that the time for the voltage signal 324A-C to reach the threshold level 326 is also dependent on the variation in a beginning voltage output from the TIA 306 following a reset 322. This variation in the beginning voltage output from the TIA after reset commonly referred to as reset noise 328.

As shown in FIG. 1, optical navigation systems 100 frequently include photo-detector arrays 110 having multiple photo-detectors 112, current signals from each of which must be measured or processed in parallel. Several of the blocks in the circuit of FIG. 3A, including the DAC 314, the RSFF 316, the driver 310 and the light source 312 can be common or shared by multiple channels receiving signals from separate photo-detector elements or groups of elements in the array 110.

Optionally, in one embodiment (not shown) where the signal processing circuit 302 processes signals from multiple channels, the comparator 304 outputs from each channel can be combined using a number of logic elements so that the light source 312 is turned off only after the measurement of the last channel is finished.

Figure 4A:
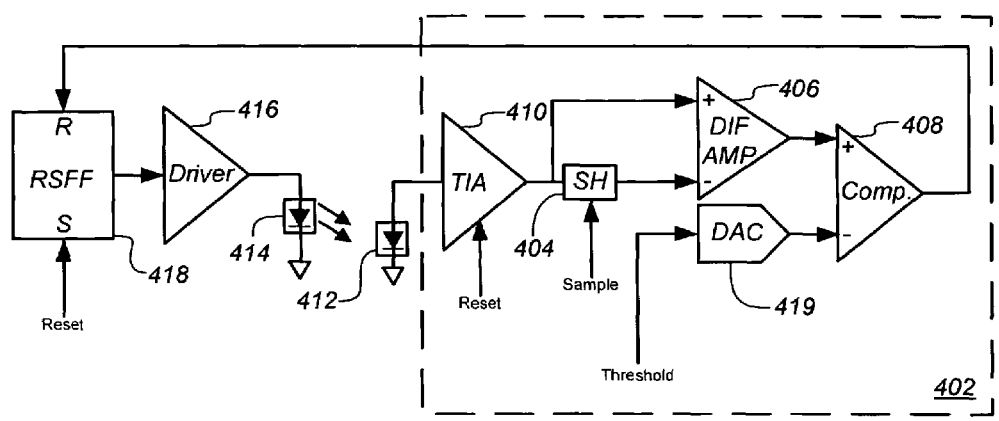
FIG. 4A is a block diagram of a circuit according to one embodiment of the present invention having a sample and hold (S/H) circuit and a differential amplifier (Diff Amp) to remove reset noise.

In one embodiment, shown in FIG. 4A, the circuit 402 further includes a sample and hold (S/H) circuit 404 and a differential amplifier 406 (Diff Amp) to remove reset noise. As in the embodiment of FIG. 3A, the signal processing circuit 402 includes a comparator 408 at the output of each Diff Amp 406 to measure the amplitude of current received from a photo-detector 412, and power is supplied to a light source 414 through a driver 416 controlled by a RSFF 418. The threshold level is provided through a DAC 419.

The S/H circuit 404 has an input coupled to the TIA 410 output to sample and hold a voltage of the voltage signal at a predetermined time following a reset. The Diff Amp 406 has a first input coupled to an output of the S/H circuit 404 and a second input coupled directly to the TIA 410 output. The Diff Amp 406 is configured to subtract the TIA reset level stored in the S/H circuit 404 from the TIA output 410, thereby measuring the slope or ramp of the voltage signal independently of the reset noise from the TIA.

Figure 4B:
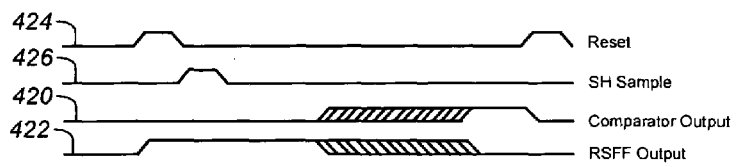
FIG. 4B is a timing diagram illustrating a comparator output and a flip-flop output (RSFF) in relation to a reset pulse for the circuit of FIG. 4A.

FIG. 4B is a timing diagram illustrating the comparator output 420 and the RSFF output 422 pulses in relation to an initialization or reset pulse 424 and a SH sample pulse 426 for the signal processing circuit 402 of FIG. 4A.

Figure 4C:
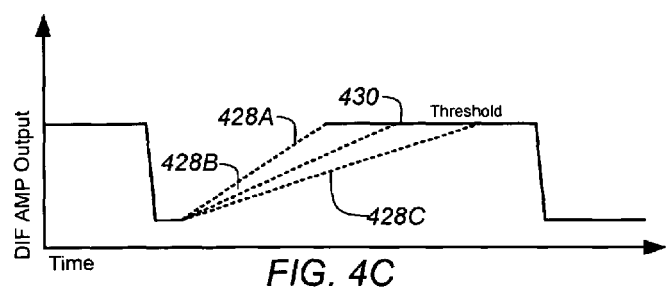
FIG. 4C is a graph illustrating the outputs of the differential amplifier versus time for a number of different input currents to the circuit of FIG. 4A according to an embodiment of the present invention.

A graph illustrating three (3) signals 428A-C of the infinite possible voltage signals output from the Diff Amp 406 for the circuit 402 of FIG. 4A is shown in FIG. 4C. It will be noted that the time for a voltage signal 428A-C output from the Diff Amp 406 to reach the threshold level 430 following a reset is substantially independent of and unaffected by reset noise.

Figure 5A:
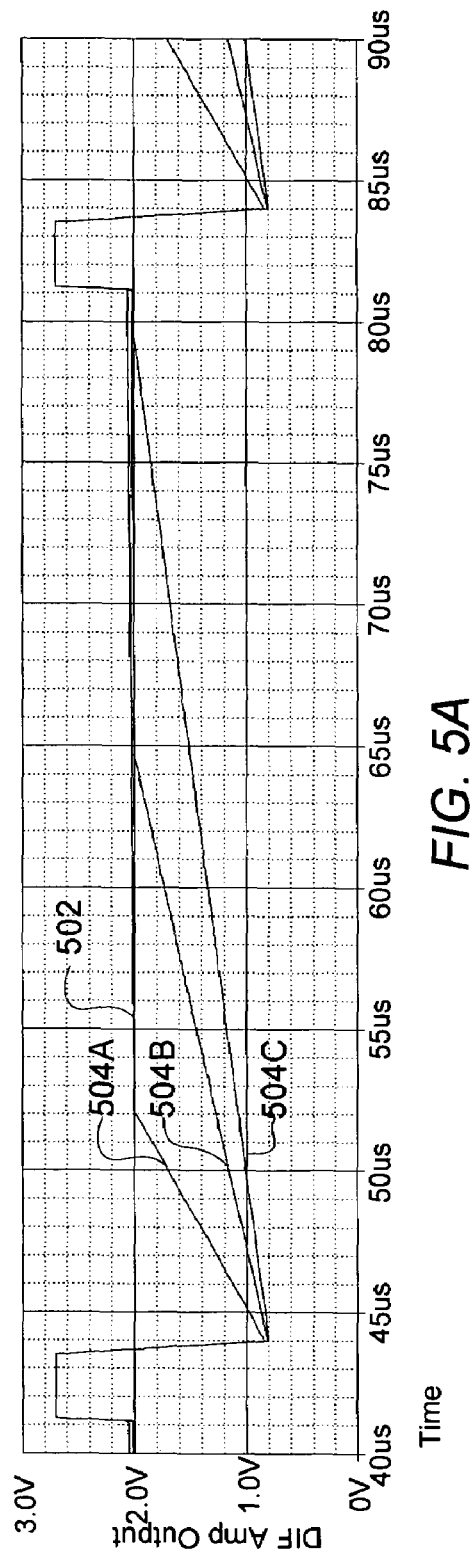
FIG. 5A is a graph showing a simulation of a TIA output versus time for a number of different input currents to a circuit having a fixed threshold according to an embodiment of the present invention.
Figure 5B:
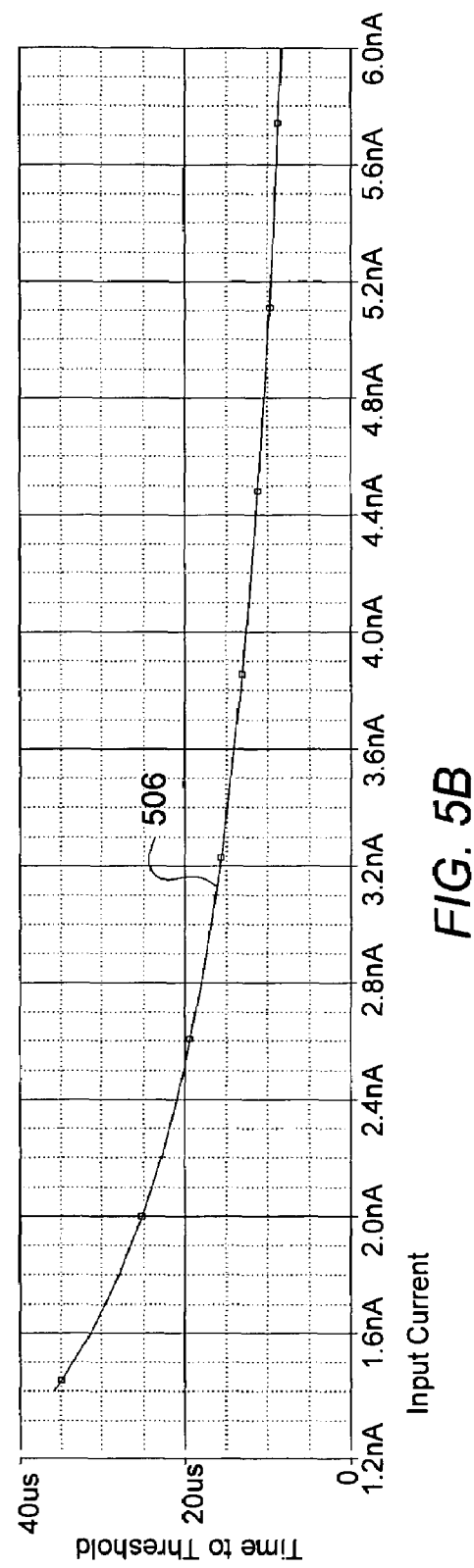
FIG. 5B is a graph illustrating time to threshold versus input current for a circuit having a fixed threshold according to an embodiment of the present invention.

FIG. 5A is a graph showing a simulation of a Diff Amp output versus time to threshold for a number of different input currents to a circuit having a fixed threshold 502, as in the circuit of FIG. 4A. In the example shown three (3) different input currents generate three (3) possible voltage signals 504A-C output from the Diff Amp. Although an improvement over conventional signal processing circuits, it is noted that using a fixed threshold level may be less than optimal, since if the received photo-detector currents into the TIA are too low the time it takes it to integrate may take longer than the interval between reset pulses, commonly known as the reset interval. It is also noted from graph or trace 506 of FIG. 5B that the integration time required to reach the threshold, which is equal or proportional to pulse width, is a 1/x function.

Figure 6A:
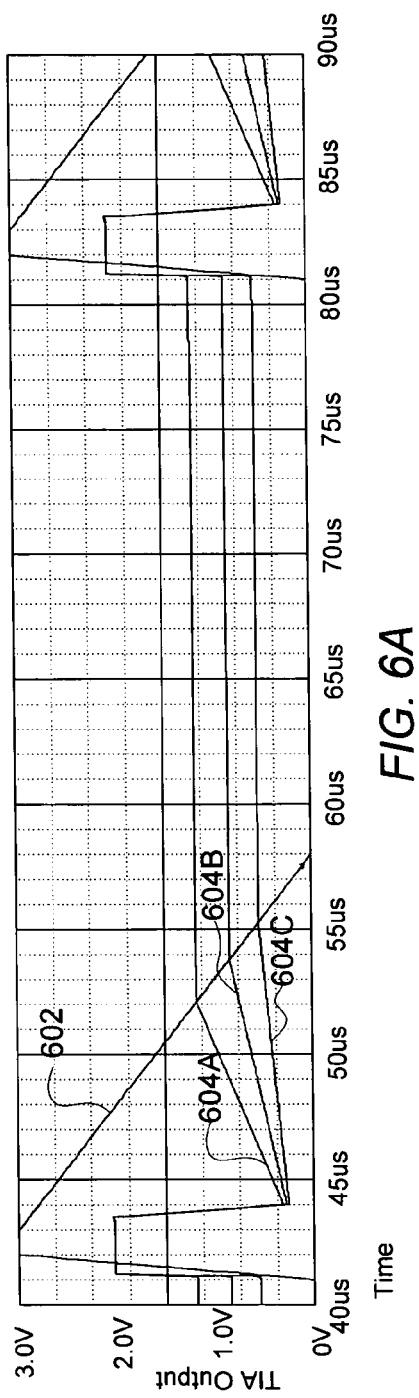
FIG. 6A is a graph showing a simulation of a TIA output versus time for a number of different input currents to a circuit having a variable threshold to provide a nearly linear response according to one embodiment of the present invention.
Figure 6B:
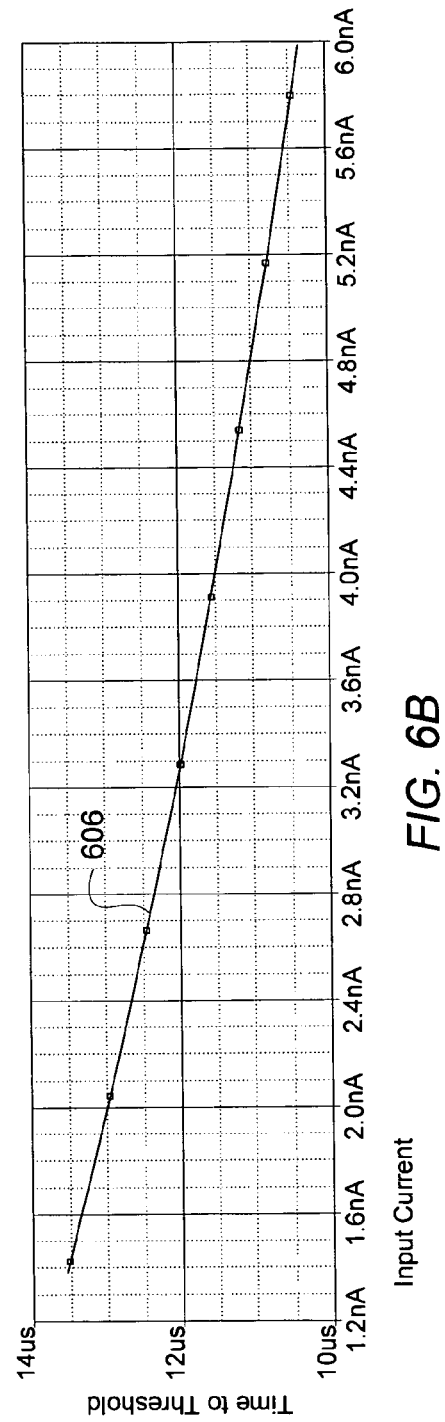
FIG. 6B is a graph illustrating time to threshold versus input current for a circuit having a variable threshold to provide a nearly linear response according to one embodiment of the present invention.

One solution that insures the threshold is reached within the reset period uses a variable threshold voltage or threshold ramp 602 as shown in FIG. 6A. In the example shown three (3) different input currents generate three (3) signals 604A-C of the infinite possible voltage signals output from the TIA.

Also note that as shown in FIG. 6A this ramped threshold approach can work for substantially all levels of received photo-detector current even down to a zero input current. That is, unlike with the fixed threshold of FIG. 5A there will be an output pulse having a finite width or duration less than the reset interval even for a zero input current. It should also be noted that although a steep slope of the threshold voltage gives a nearly linear response, it does so at the expense of time resolution. That is, as shown by the graph or trace 606 of FIG. 6B, the difference in time to threshold (and therefore in pulse width) for materially different received currents of from 1.4 nA to 5.8 nA is reduced to less than 3 µs.

Figure 7A:
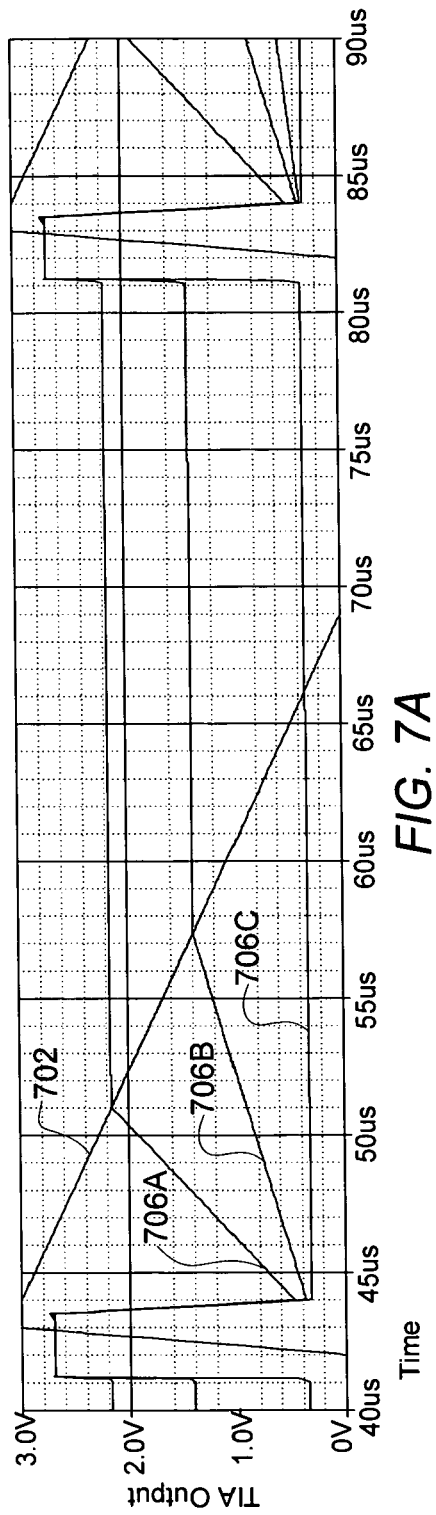
FIG. 7A is a graph showing a simulation of a TIA output versus time for a number of different input currents to a circuit having a variable threshold selected to provide increased time resolution according to another embodiment of the present invention.
Figure 7B:
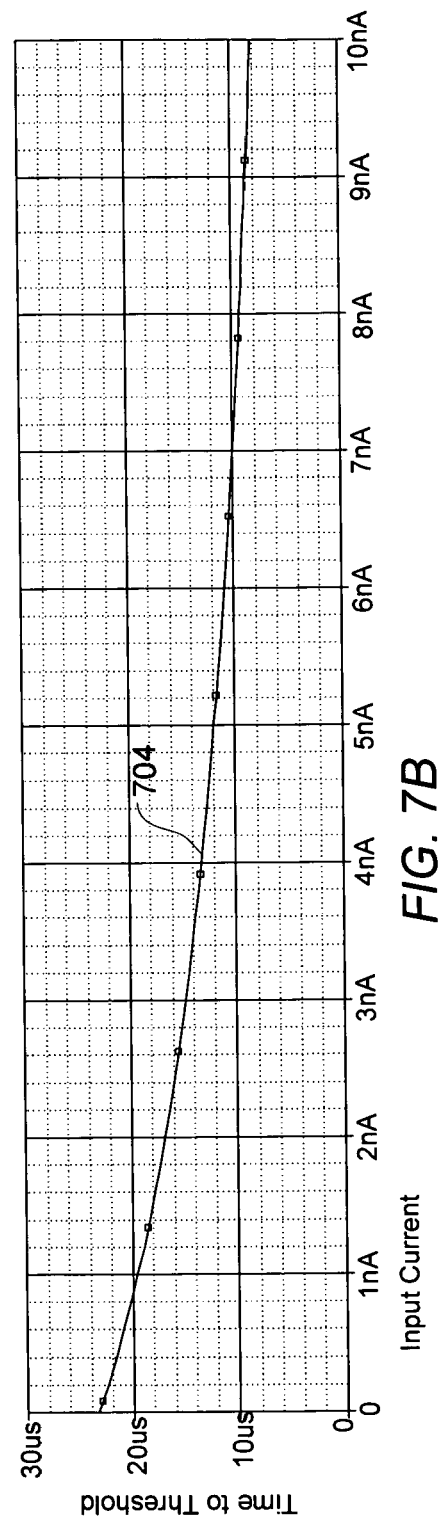
FIG. 7B is a graph illustrating time to threshold versus input current for a circuit having a variable threshold selected to provide increased time resolution according to one embodiment of the present invention.

One method of improving time resolution involves adjusting or decreasing the slope of the threshold ramp 702 as shown in FIG. 7A, thereby achieving improved time resolution as shown by the graph or trace 704 in FIG. 7B. In the example shown three (3) different input currents generate three (3) voltage signals 706A-C output from the TIA. It is also noted from graph or trace 704 of FIG. 7B that although time resolution is improved there is still a non-linear response time versus input current in this embodiment.

Figure 8A:
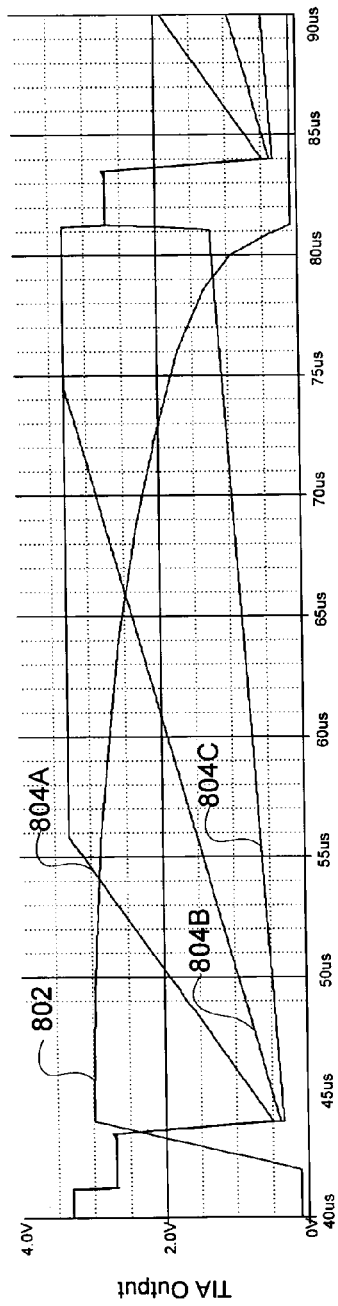
FIG. 8A is a graph showing a simulation of a TIA output versus time for a number of different input currents to a circuit having a shaped threshold selected to provide a desired time to threshold response according to one embodiment of the present invention.
Figure 8B:
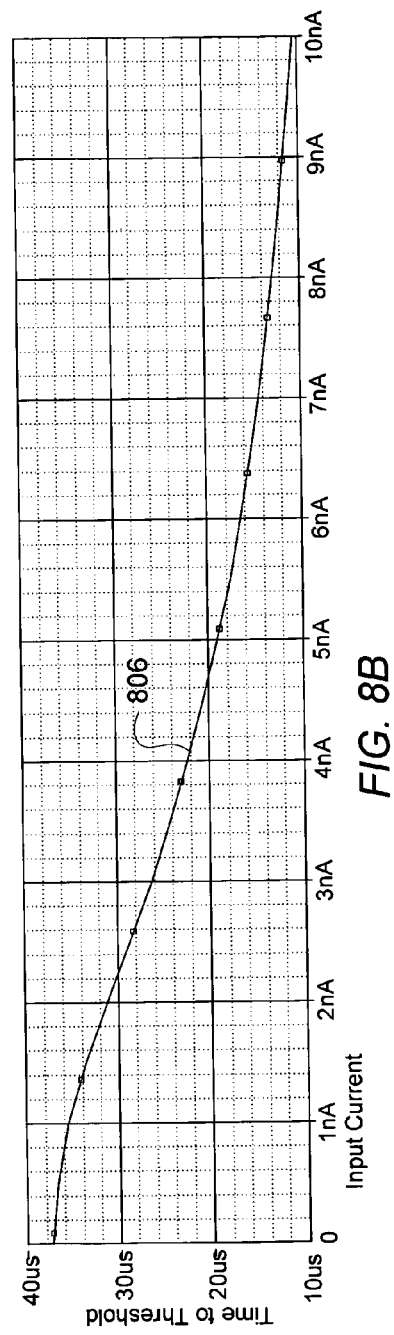
FIG. 8B is a graph illustrating time to threshold versus input current for a circuit having a shaped threshold selected to provide a desired time to threshold response according to one embodiment of the present invention.

In yet another embodiment, shown in FIG. 8A, the threshold voltage 802 is a shaped threshold voltage that decreases or ramps non-linearly at a rate selected to provide a desired response out from the signal processor. In the example shown three (3) different input currents generate three (3) voltage signals 804A-C output from the TIA. Note that in this example the light source was not extinguished when the threshold was reached but allowed to integrate until the amplifier saturation was reached, thus each of the 3 voltage signals 804A-C continue to increase after crossing the threshold 802. However, it will be appreciated that this is not a requirement of this technique, but rather the light source could have been shut off when the threshold voltage was crossed, for example by an RS flip-flop as in the preceding embodiments of FIGS. 3A and 4A.

Figure 8C:
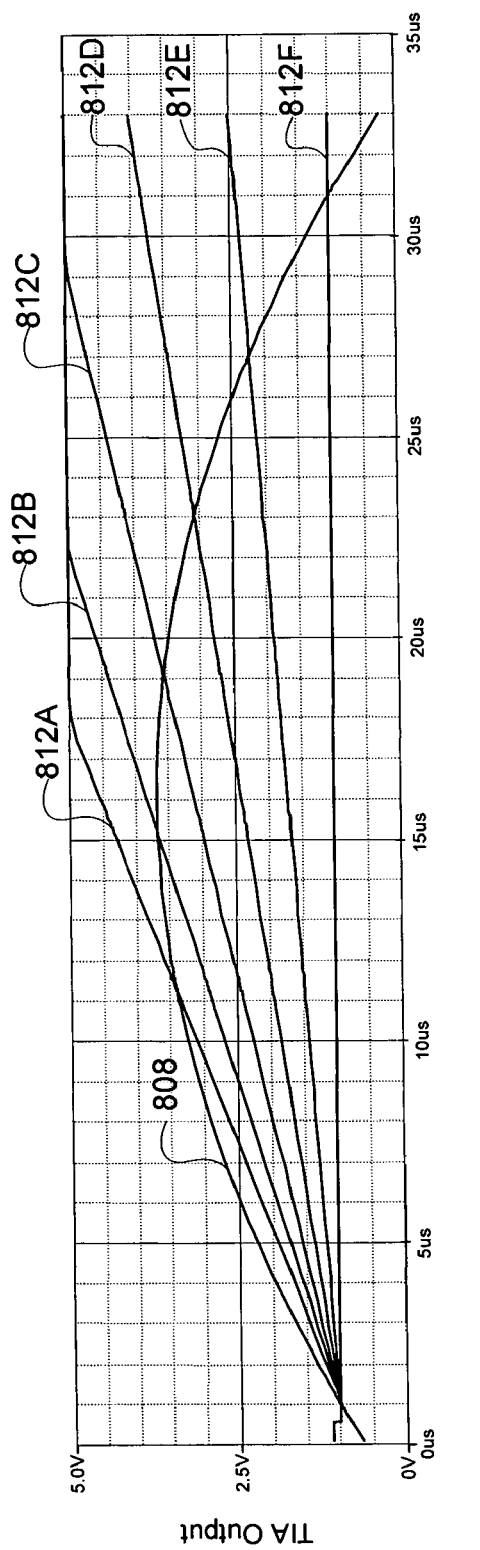
FIG. 8C is a graph showing a simulation of a TIA output versus time for a number of different input currents to a circuit having a shaped threshold shaped in conformity with a second order polynomial to provide a linear response according to one embodiment of the present invention.
Figure 8D:
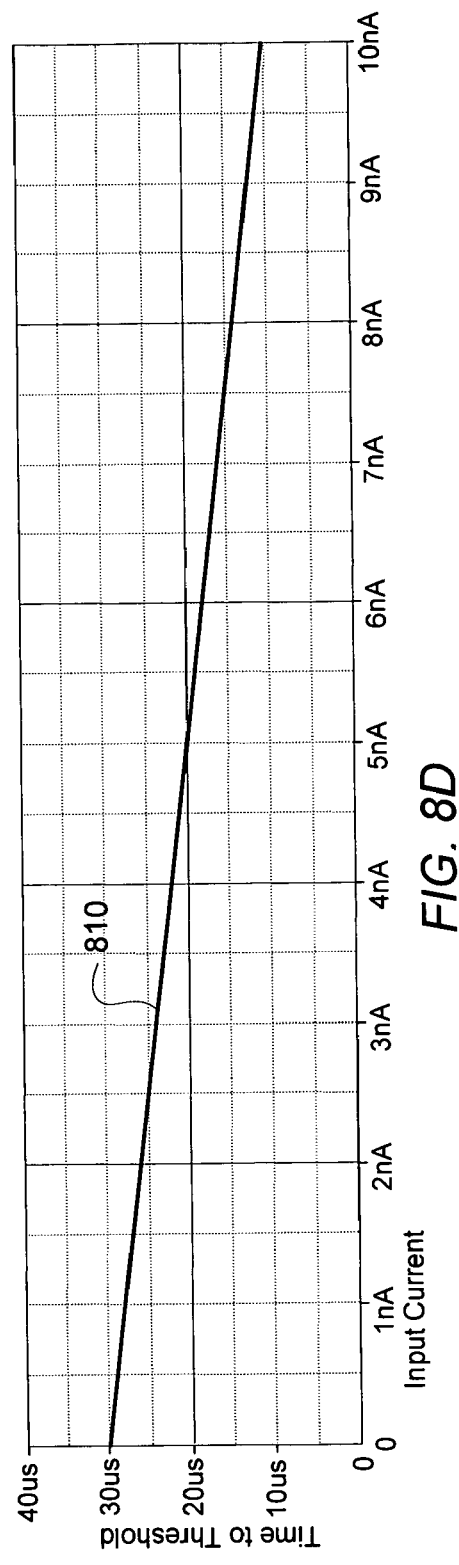
FIG. 8D is a graph illustrating time to threshold versus input current for a circuit having a shaped threshold selected to provide a linear response according to one embodiment of the present invention.

In still another embodiment, shown in FIGS. 8C and 8D, the threshold voltage (Vt), shown as a graph or trace 808 in FIG. 8C, to achieve a linear response is defined by a second ($2^{nd}$) order polynomial defined by the following equation:

$$Vt=(mt^2+bt)/C$$

where m is the slope of the linear response, shown as a graph or trace 810 in FIG. 8D, in Amps per second, t is time in seconds, b is the current at time zero, and C is the integrator capacitance. The graph or trace of the linear response 810 illustrates the further improvement in time resolution within a limited ranges made possible by a shaped threshold as compared to the threshold ramps of the embodiments of FIGS. 6 and 7.

FIG. 8C shows an exemplary shaped threshold curve 808 for a voltage signal having a time from the reset to the threshold of from 10 us to 30 us (in this example reset ends at about 1 us) and received current of from to 10 nA to 0 nA, and a current at zero time (b) of b=1.5 nA or 1.5E-8A (the current if you extended the response line down to 0 us) to provide linear or nearly response having a slope (m) of about −0.5 nA/us or 0.0005 A/s. In this example, the integrator is assumed to have a capacitance (C) of about 42 fF (femto-Farads) or 4.2E-14F. In addition to the shaped threshold curve 808 FIG. 8C shows (5) different voltage signals 812A-F output from the TIA and produced from (5) five different input currents. Note that in this example the light source was not extinguished when the threshold was reached but allowed to integrate until the amplifier saturation was reached, thus each of the 5 voltage signals 812A-F continue to increase after crossing the threshold 808. However, it will be appreciated that this is not a requirement of this technique, but rather the light source could have been shut off when the threshold voltage was crossed, for example by an RS flip-flop as in the preceding embodiments of FIGS. 3A and 4A.

Figure 9A:
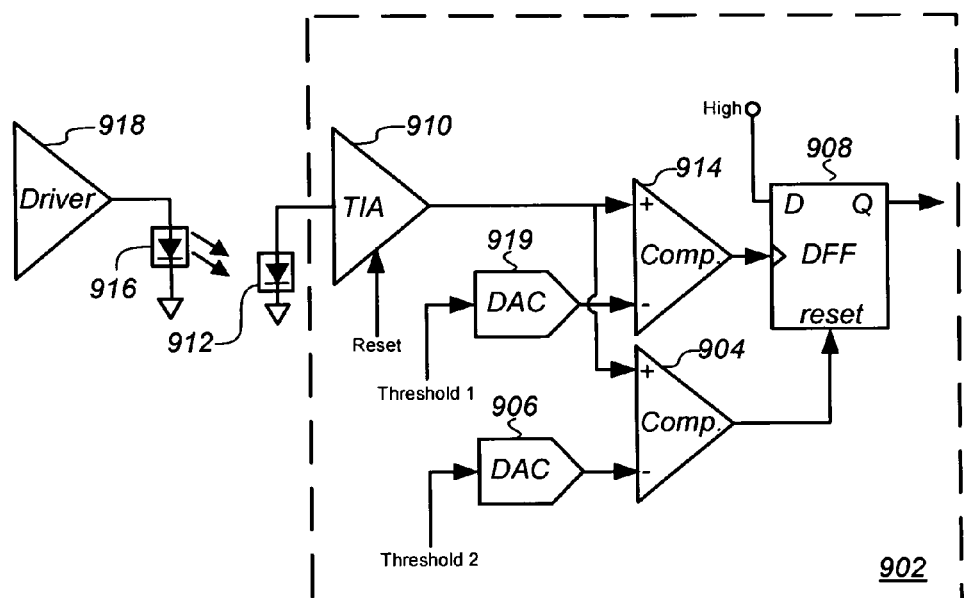
FIG. 9A is a block diagram of a circuit with double thresholds to remove reset noise according to an embodiment of the present invention.

In one embodiment, illustrated in FIG. 9A, a double threshold is used to remove the reset noise. In this embodiment, the signal processing circuit 902 further includes a second comparator 904, a second DAC 906 to provide a threshold level to the second comparator, and a D-type flip-flop 908 (DFF). As in the previous embodiments, the signal processing circuit 902 includes a TIA 910 to integrate the amplitude of current received from a photo-detector 912, and a first comparator 914. Power is supplied to a light source 916 through a driver 918. The first threshold level is provided to the first comparator 914 through a first DAC 919.

Although not shown it will be appreciated that the circuit 902 can further include a control element, such as an RSFF coupled, between the driver 918 and an output from the DFF 908 to turn off the light source 916, thereby reducing power consumption in the optical navigation system.

Referring to FIG. 9A, the second comparator 904 has a first, non-inverting input coupled to the output of the TIA 910, and a second, inverting, input coupled to the second threshold level through the second DAC 906. The DFF 908 has an input coupled to the output of the first comparator 914, and a reset coupled to an output of the second comparator 904. The DFF 908 is set when the first threshold level is reached and reset when the second threshold level is reached. The pulse width of the output of the DFF 908 is a measure of the input current. By placing the second threshold, parallel to the first, lower threshold the difference in time it takes to cross both thresholds is insensitive to reset noise.

Figure 9B:
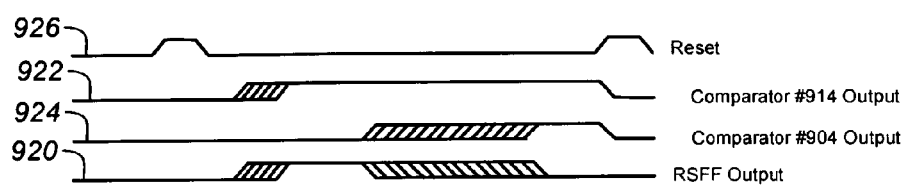
FIG. 9B is a timing diagram illustrating the comparator outputs and the flip-flop output (RSFF) in relation to a reset pulse for the circuit of FIG. 9A.

FIG. 9B is a timing diagram illustrating the DFF output 920 in relation to the first comparator 914 output 922 and second comparator 904 output 924 and an initialization or reset pulse 926 for the signal processing circuit 902 of FIG. 9A.

Figure 9C:
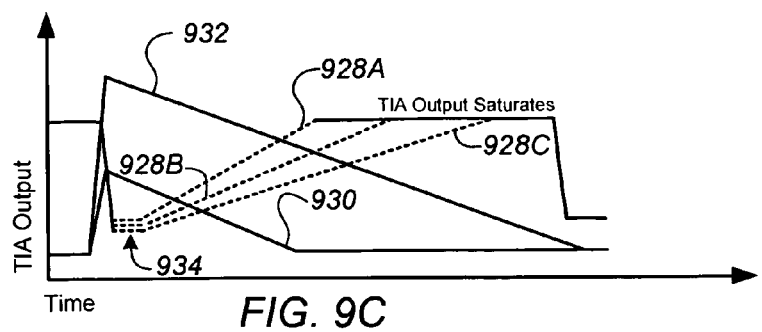
FIG. 9C is a graph illustrating the outputs from a TIA versus time for a number of different input current to the double threshold circuit of FIG. 9A according to one embodiment of the present invention.

A graph illustrating three (3) signals 928A-C of the infinite possible voltage signals output from the TIA 910 for the circuit 902 of FIG. 9A is shown in FIG. 9C. It will be noted that, provided the first and second threshold levels 930, 932 are substantially parallel, the time for a voltage signal, such as one of the signals 928A-C, output from the TIA 910 to reach the second threshold level 932 following reach the first threshold level 930 is substantially independent of an unaffected by reset noise 934.

Figure 10A:
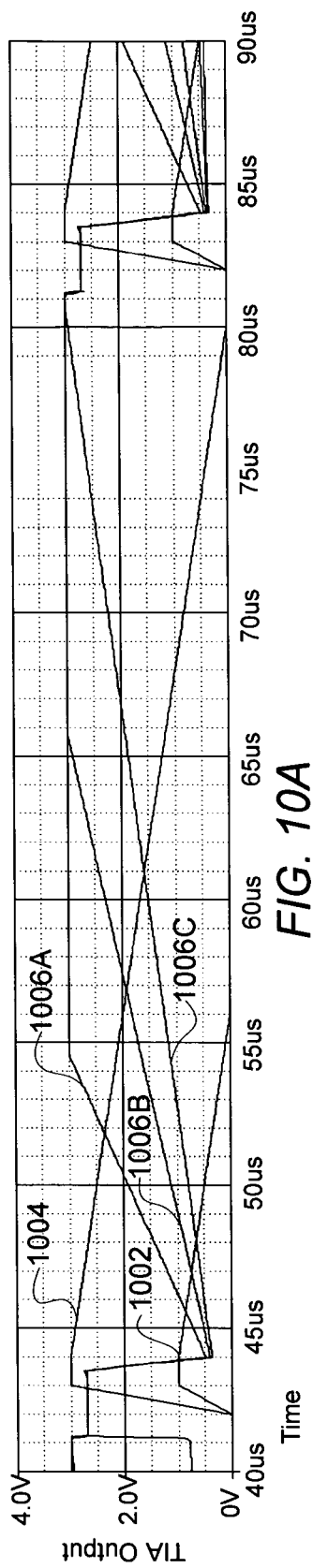
FIG. 10A is a graph showing a simulation of a TIA outputs and thresholds versus time for a number of different input currents to the double threshold circuit of FIG. 9A according to an embodiment of the present invention.
Figure 10B:
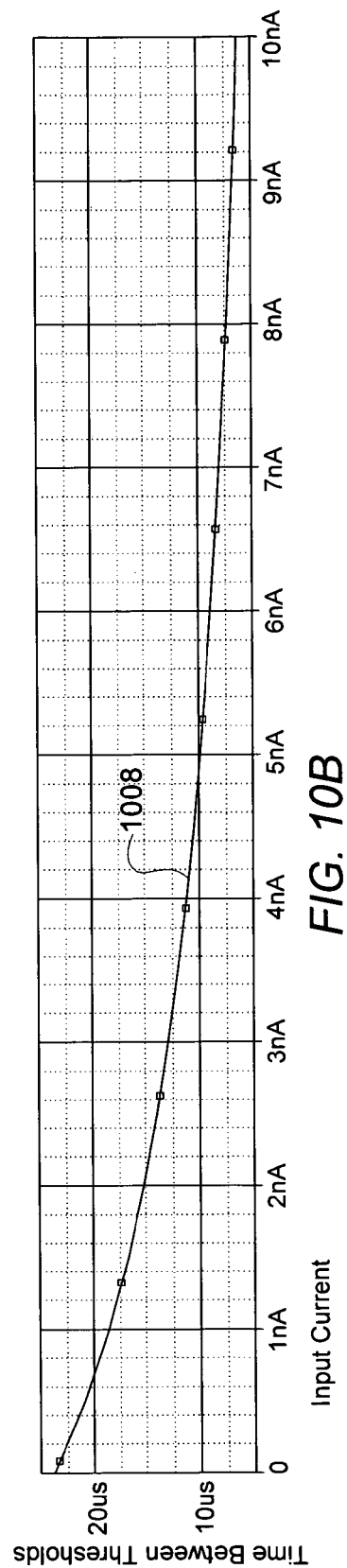
FIG. 10B is a graph illustrating time between thresholds versus input current for the double threshold circuit of FIG. 9A according to an embodiment of the present invention.

FIGS. 10A and 10B illustrate the results of a simulation of the double threshold circuit. In particular, FIG. 10A is a graph illustrating three (3) signals 1006A-C of the infinite possible voltage signals output from the TIA versus time to a first ramped threshold 1002 and a second ramped threshold 1004 for a number of different input currents to the circuit 902 of FIG. 9A. FIG. 10B shows a graph or trace 1008 time between the first and second thresholds 1002, 1004, versus input current, and illustrates the method for reducing sensitivity to reset noise by the use of a double threshold circuit FIG. 9A.

The advantages of the signal processor and method of the present invention over previous or conventional approaches include: (i) reduced complexity and increased performance (speed) through the elimination of the ADC(s); (ii) reduced power consumption through control of the driver to the VCSEL or laser; and (iii) the measurement of the voltage signal from the TIA output is independent of and substantially unaffected by reset noise.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teachings. It is intended that the scope of the invention encompass the generic area as herein disclosed, and by the claims appended hereto and their equivalents.

What is claimed is:

1. A signal processor for use with an optical navigation system, the signal processor comprising:
   a transimpedance amplifier (TIA) to integrate a current received from a photo-detector in the optical navigation system to generate a voltage signal having a slope that is proportional to the received current;
   a comparator having a first input coupled to an output of the TIA to receive the voltage signal, and a second, inverting, input coupled to a threshold voltage, the comparator configured to compare the voltage signal to the threshold voltage and to generate an output pulse having a predetermined voltage and a duration that is a function of the received current; and
   a sample and hold (S/H) circuit and a differential amplifier (Diff Amp) coupled between the TIA output and the first input of the comparator, wherein:
   the S/H circuit has an input coupled to the TIA output to sample and hold a voltage of the voltage signal at a first predetermined time following a reset of the signal processor; and
   the Diff Amp has a first input coupled to an output of the S/H circuit and a second input coupled to the TIA output to determine a difference between the voltage stored in the S/H circuit and a voltage of the voltage signal at the output of the TIA at a second predetermined time,
   whereby the voltage signal coupled to the first input of the comparator is independent of and substantially unaffected by reset noise from the TIA.

2. A signal processor according to claim 1, further comprising a counter coupled to an output of the comparator, the counter configured to receive the pulse from the comparator and latch the counter, thereby executing an analog to digital conversion of the current received from the photo-detector.

3. A signal processor according to claim 1, further comprising a circuit coupled between an output of the comparator and a driver supplying power to a light source in the optical navigation system, the circuit configured to turn off the light source when the voltage signal reaches the threshold voltage, whereby power consumption in the optical navigation system is reduced.

4. A signal processor according to claim 1, wherein the threshold voltage coupled to the second input of the comparator is a variable voltage.

5. A signal processor according to claim 4, wherein the threshold voltage changes from a predetermined first voltage at a first time following the reset or initialization of the signal processor to a second, lower voltage at a second time following the reset or initialization of the signal processor.

6. A signal processor according to claim 5, wherein the threshold voltage monotonically decreases in accordance with a predetermined function selected to provide a substantially linear response out from the signal processor.

7. A signal processor according to claim 5, wherein the threshold voltage monotonically decreases in accordance with a predetermined function selected to provide increased resolution in a response from the signal processor.

8. A signal processor according to claim 5, wherein the threshold voltage is defined by a $2^{nd}$ order polynomial to provide a linear response out from the signal processor.

9. A signal processor for use with an optical navigation system, the signal processor comprising:
   a transimpedance amplifier (TIA) to integrate a current received from a photo-detector in the optical navigation system to generate a voltage signal having a slope that is proportional to the received current;
   a comparator having a first input coupled to an output of the TIA to receive the voltage signal, and a second, inverting, input coupled to a threshold voltage, the comparator configured to compare the voltage signal to the threshold voltage and to generate an output pulse having a predetermined voltage and a duration that is a function of the received current; and
   wherein the threshold voltage is defined by the following equation:

$$Vt=(mt^2+bt)/C$$

where m is the slope of a linear response out from the signal processor in amps per second, t is time in seconds, b is the current at time zero, and C is the capacitance of an integrator in the TIA.

10. A method of measuring current received from a photo-detector using a signal processor, comprising steps of:
    integrating the current received from a photo-detector to generate a voltage signal having a slope that is proportional to the received current;
    comparing the voltage signal to a threshold voltage defined by the following equation:

$$Vt=(mt^2+bt)/C$$

where m is the slope of a linear response out from the signal processor in amps per second, t is time in seconds, b is the current at time zero, and C is the capacitance of an integrator in a transimpedance amplifier (TIA) used to integrate the current received from the photo-detector; and
    generating an output pulse having a predetermined voltage and a duration that is a function of the received current.

11. A method according to claim 10, further comprising the steps of coupling the output pulse to a counter and latching the counter using the output pulse, thereby converting the output pulse to a digital signal.

12. A method according to claim 10, wherein the step of comparing the voltage signal to a threshold voltage comprise the step of comparing the voltage signal to a variable threshold voltage changing from a predetermined first voltage at a first time following a reset of the signal processor to a second, lower voltage at a second time following the reset of the signal processor.

13. A method according to claim 12, wherein the threshold voltage monotonically decreases in accordance with a predetermined function selected to provide a substantially linear response out from the signal processor.

14. A method according to claim 12, wherein the threshold voltage monotonically decreases in accordance with a predetermined function selected to provide increased resolution in a response from the signal processor.

* * * * *